United States Patent [19]

Cestaro

[11] Patent Number: 5,503,578
[45] Date of Patent: Apr. 2, 1996

[54] STERN DRIVE LOCKING COLLAR

[76] Inventor: Christopher P. Cestaro, 372 Maple Ave., Old Saybrook, Conn. 06475

[21] Appl. No.: 501,495

[22] Filed: Jul. 12, 1995

[51] Int. Cl.⁶ .......................... B60R 25/00; B63H 23/32
[52] U.S. Cl. ........................ 440/83; 440/57; 440/113; 70/182
[58] Field of Search ................... 440/83, 57, 55, 440/111–113; 70/14, 19, 158, 163–166, 181–189, 232, 178; 464/185, 179, 180

[56]      References Cited

U.S. PATENT DOCUMENTS

| | | | |
|---|---|---|---|
| 2,048,424 | 7/1936 | Caldwell | 70/232 |
| 3,951,096 | 4/1976 | Dunlap | 440/57 |
| 4,296,615 | 10/1981 | Zoor | 70/19 |
| 4,325,701 | 4/1982 | Peters, II et al. | 70/163 |

*Primary Examiner*—Edwin L. Swinehart
*Attorney, Agent, or Firm*—DeLio & Peterson

[57]               ABSTRACT

A device to discourage theft of stern drives of power boat inboard-outboard propulsion units comprises a locking collar installed about the drive shaft at a location between the engine and the transom of the boat to prevent withdrawal of the drive shaft through the transom passage.

4 Claims, 1 Drawing Sheet

STERN DRIVE LOCKING COLLAR

BACKGROUND OF THE INVENTION

1. Field of the Invention

The invention is directed to the provision of an inboard lock means for a power boat inboard-outboard propulsion unit to discourage theft of the stern drive portion of the propulsion unit.

2. Description of Related Art

In power boats the inboard-outboard propulsion unit is a powerplant which couples a typical inboard engine to a drive unit which is essentially the lower unit of an outboard motor and is mounted outboard at the stern of the boat. The drive unit is known by various names—outdrive, outboard drive, stern drive, transom drive and "Z" drive. A horizontal drive shaft projects aft from the engine through the transom, above the water line, and is geared to a vertical shaft of the stern drive. The latter, mounted outside and rearward of the transom, functions essentially like a conventional outboard motor, swinging from side to side for steering and tilting upward for beaching or upon striking an underwater obstacle. The inboard-outboard propulsion unit thus combines the advantage of a permanently installed relatively powerful inboard engine with the handling and steering capability characteristic of the outboard motor.

The inboard-outboard propulsion unit has become quite popular and is presently installed on boats from about 15 feet in length up to about 30 feet in length. With this increasing popularity, the incidence of thefts of stern drives has risen. The stern drive is secured to the transom of a boat through a gimbal housing which is integral with the stern drive. It is relatively easy to loosen and remove the bolts attaching the gimbal housing to the stern drive, thus freeing the stern drive and enabling one to withdraw the drive shaft (which has splined shaft connection with the engine) from the engine through the passage provided in the transom for the drive shaft. The stern drive with the drive shaft are thus separated from the boat.

Bolt locks are available on the market as a measure to prevent or delay these thefts and by replacing one of the standard bolts with a bolt lock at least some delay of the projected theft is doubtless effected. However, since the lock is readily visible from the exterior of the boat, a perpetrator would be able to readily identify the lock without boarding the boat, evaluate its weakness and plan a strategy to defeat it. Once the boat lock is defeated, the remaining bolts may be removed and the theft accomplished in a relatively short time, all without ever boarding the boat. There have been recent instances in which stern drives secured by such boat locks were stolen.

Bearing in mind the problems and deficiencies of the prior art, it is therefore an object of the present invention to provide an inboard lock for the stern drive of a power boat which will compel one intent on theft of a stern drive to first gain entry to the engine compartment and labor there to defeat the lock.

It is another object of the present invention to provide a locking collar for a stern drive wherein the locking collar is not visible from outside the boat.

It is yet another object of the present invention to provide a locking collar which is easily installed to hinder theft of stern drives.

Still other objects and advantages of the invention will in part be obvious and will in part be apparent from the specification.

SUMMARY OF THE INVENTION

In this invention a lock mechanism is secured to the engine drive shaft at a position aft of the engine and forward of the transom such that the effective diameter of the drive shaft is increased to prevent withdrawal of the drive shaft through the drive shaft passage provided in the transom. The lock mechanism is a split ring whose halves can be drawn together by fastening means to tightly secure the collar about and in contact with the circumference of the drive shaft. With the lock collar in place, the combined diameter of the drive shaft and the collar secured thereto exceeds the diameter of the passage provided for the drive shaft in the transom and, consequently, the drive shaft with the lock collar mounted thereon has a diameter too great to permit it to negotiate the passage through the transom.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS(S)

Figure 1:
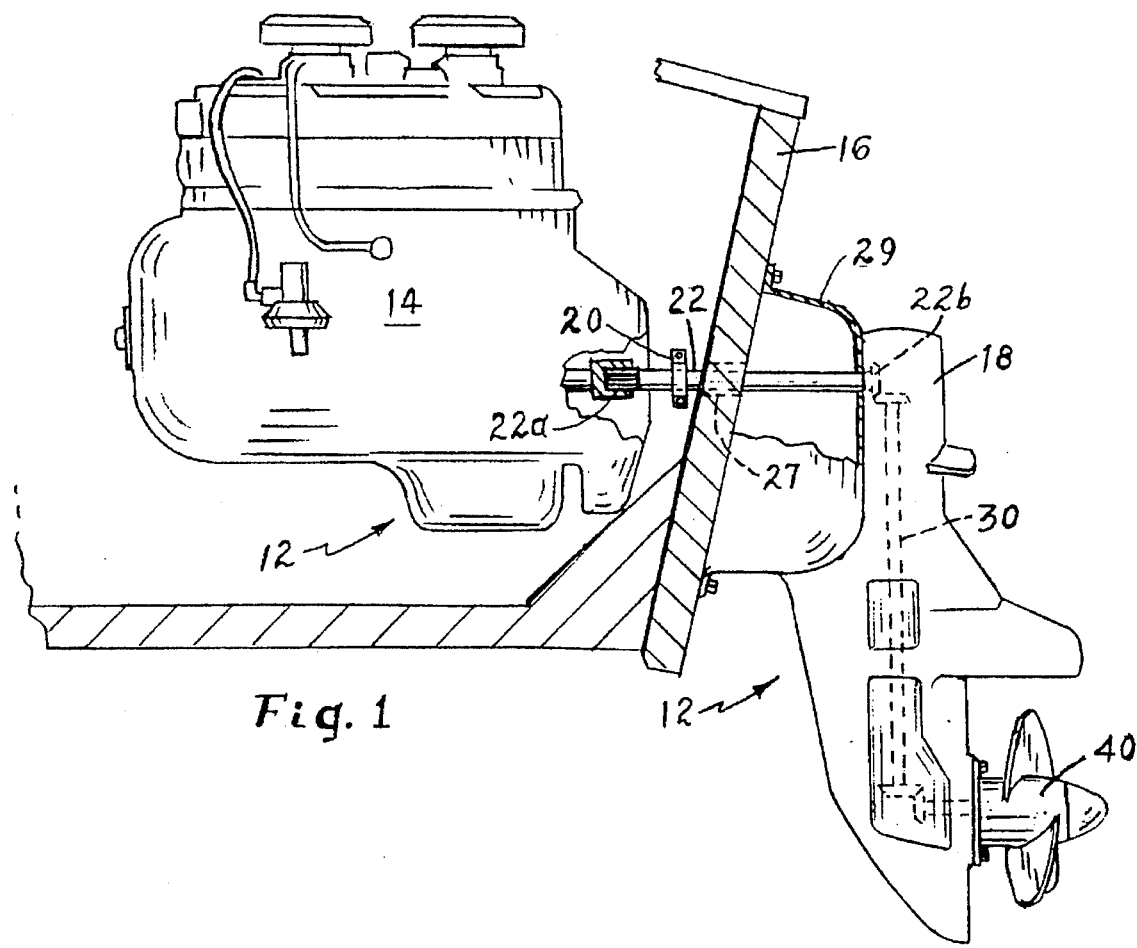
FIG. 1 is a schematic elevational view of the stern portion of a water craft having a propulsion unit of the inboard-outboard type equipped with a lock collar in accordance with the present invention.

In describing the preferred embodiment of the present invention, reference will be made herein to FIGS. 1–4 of the drawings in which like numerals refer to like features of the invention. Features of the invention are not necessarily shown to scale in the drawings.

Referring to FIG. 1 of the drawings, the stern portion of a water craft is shown with an inboard-outboard propulsion unit 12 installed about (forward and aft of) the transom 16. This propulsion unit comprises an internal combustion engine 14 located inboard of transom 16 and a stern drive assembly 18 outboard of transom 16. A drive shaft 22 connects engine 14 with stern drive 18, the drive shaft passing horizontally through passage 27 provided in transom 16. Drive shaft 22 has a slideable connection with engine 14; for example, the drive shaft is splined at end 22a to mate with an internally grooved cylindrical member within the engine 14. The opposite end 22b of drive shaft 22 is provided with a gear to transmit rotation of the drive shaft 22 to a vertical drive shaft 30 which, in turn, through appropriate gears transmits rotation to the propeller 40.

The structure of the inboard/outboard propulsion unit is first considered as it relates to possible theft of the stern drive. The gimbal housing 29 is secured to the transom 16 and bolted to the stern drive 18, thereby permitting the vertical and horizontal rotation of the stern drive. In theft of stern drive 18, the perpetrator would remove the bolts securing the stern drive to the gimbal housing. This can be accomplished without entering the boat. The stern drive would then be pulled rearwardly, withdrawing drive shaft 22 from engine 14, and continuing withdrawal of drive shaft 22 through transom passage 27, thereby completely freeing the stern drive from the boat for removal.

In accordance with the present invention, locking means are provided within the boat for preventing such easy separation of the stern drive from the engine.

Figure 2:
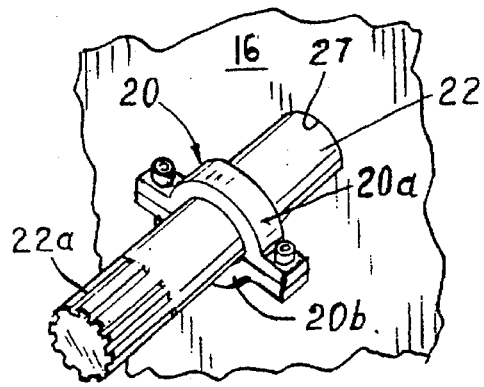
FIG. 2 is a perspective view of the lock collar of the present invention shown mounted on a drive shaft and in relation to the passage in the transom.
Figure 3:
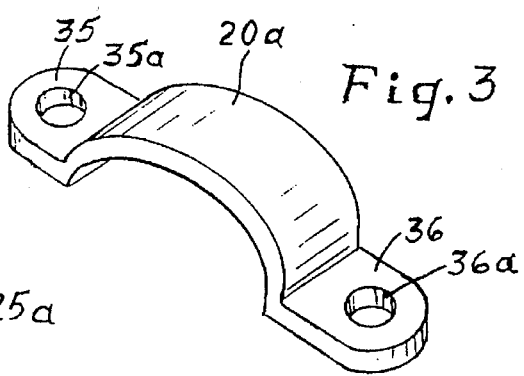
FIG. 3 is a perspective view of one arcuate element of the locking collar of the invention.

Mounted on drive shaft 22 between the engine 14 and transom 16 is the locking collar 20 which is seen in greater detail in FIGS. 2 and 3. The locking collar 20 is formed of a pair of a generally arcuate members 20a and 20b which, when assembled perpendicular to the axis of the drive shaft, completely or very nearly surrounds the circumference of drive shaft 22. The arcuate members 20a and 20b may each be provided with a pair of lugs 35 and 36 having holes 35a and 36a therein. When the arcuate members 20a and 20b are assembled about drive shaft 22 the lugs on arcuate member 20a are in opposed relationship to the lugs of arcuate member 20b and threaded members may be introduced through opposed holes in the lugs. The arcuate members 20a and 20b may then be drawn toward each other and tightly fixed about the drive shaft 22.

Figure 4:
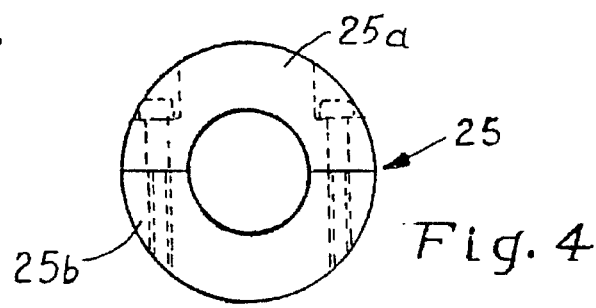
FIG. 4 is an elevational view of a alternative form of locking collar.

An alternative form of a locking collar 25 is illustrated in FIG. 4. In this form the threaded holes pass through arcuate bodies 25a and 25b; the holes in body 25a registering with the holes in 25b, and externally extending lugs are not required.

It will be noted that the external diameter of the locking collars 20 or 25 assembled about drive shaft 22 greatly exceeds the diameter of passage 27 through the transom 16. Withdrawal of the drive shaft from engine 14 and through passage 27 is thus defeated. Before the engine 14 can be separated from the stern drive 18, locking collars 20 or 25 must be disassembled and removed from the drive shaft 22 and for this, access to the boat's engine compartment must be gained.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An inboard-outboard propulsion unit for power boats comprising an internal combustion engine installed near the transom of a boat with drive connection through the transom to a stern drive, said unit having lock means for preventing theft of said stern drive, said drive connection comprising a drive shaft having slidably removable joinder with said engine at one end thereof and geared connection with said stern drive at the other end, said transom having a passage therethrough of dimensions just accommodating said drive shaft, a lock mechanism comprising a locking collar secured in fixed position about the circumference of the drive shaft at a location between the engine and the transom to prevent sliding withdrawal of the drive shaft through said passage due to the increased diameter of the structure provided by said locking collar mounted on said drive shaft.

2. The inboard-outboard propulsion unit of claim 1 wherein said locking collar comprises a pair of semi-circular members which when mated provided a circular collar structure having an internal diameter approximately that of said drive shaft and an external diameter substantially exceeding that of said drive shaft, said pair of members being secured by fastening means about said drive shaft in tight frictional contact therewith.

3. The inboard-outboard propulsion unit of claim 2, wherein each of said semi-circular members is provided with a pair of external lugs having holes therein such that when said semi-circular members are mated about said drive shaft, said fastening means can be passed through said holes to secure said members together.

4. The inboard-outboard propulsion unit of claim 2 wherein each of said semi-circular members is provided in the body thereof with holes for registry with the other when mated and said fastening means is located in said registered holes to secure said members together.

* * * * *